United States Patent [19]
Austin

[11] Patent Number: 5,078,443
[45] Date of Patent: Jan. 7, 1992

[54] PICKUP BED SEAT APPARATUS

[76] Inventor: Christopher L. Austin, 4929 Luna Dr., Oceanside, Calif. 92056

[21] Appl. No.: 657,420

[22] Filed: Feb. 19, 1991

[51] Int. Cl.$^5$ ............................................. B60M 1/00
[52] U.S. Cl. ........................................ 296/63; 5/433; 296/64; 296/37.6
[58] Field of Search .................... 296/63, 64, 65.1; 297/377; 5/433, 432, 420, 417, 418, 419, 449, 464, 465

[56] References Cited

U.S. PATENT DOCUMENTS

| | | | |
|---|---|---|---|
| 3,829,151 | 8/1974 | Fellenstein | 296/64 |
| 3,840,263 | 10/1974 | Bowden | 296/64 |
| 4,315,653 | 2/1982 | Sparling | 296/64 |
| 4,623,187 | 11/1986 | Ibrahim | 296/64 |
| 4,679,840 | 7/1987 | Fry et al. | 296/64 |
| 4,789,574 | 12/1988 | Selvey | 296/39.2 |
| 4,945,587 | 8/1990 | Ferro | 5/420 |

*Primary Examiner*—Robert R. Song
*Attorney, Agent, or Firm*—Leon Gilden

[57] ABSTRACT

An apparatus for providing seating and entertainment arrangement within a pickup bed is provided, including an adjustable backrest mounted within the pickup to accommodate a cushion member and position a vertical extent of the cushion member in adjustable orientation relative to a horizontal portion of the cushion member. Padded wall members are provided for securement adjacent the side walls of the pickup bed, and further including a wheel well covering formed with cylindrical recesses therewithin to accommodate various drinking cups and the like therewithin. A modification of the invention includes the cushioned member formed with top and side walls of transparent material and a floor formed of opaque material with a reflective member mounted coextensively to the floor to permit the cushioned member to effect heating of chambers defined within the cushioned member or conversely, the cushioned member may be reversed to cushion the floor overlying the top wall to minimize heat buildup in the cushion member.

6 Claims, 5 Drawing Sheets

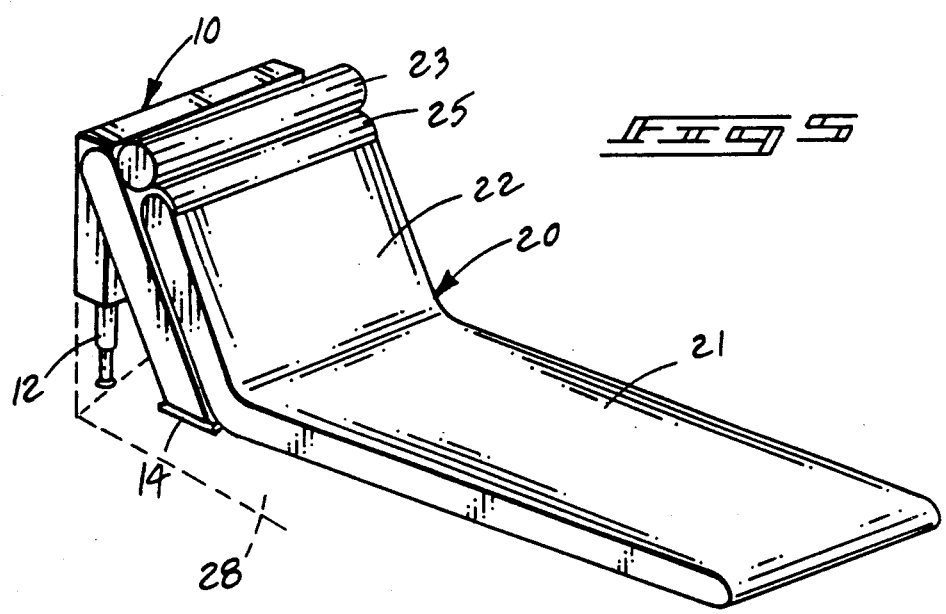
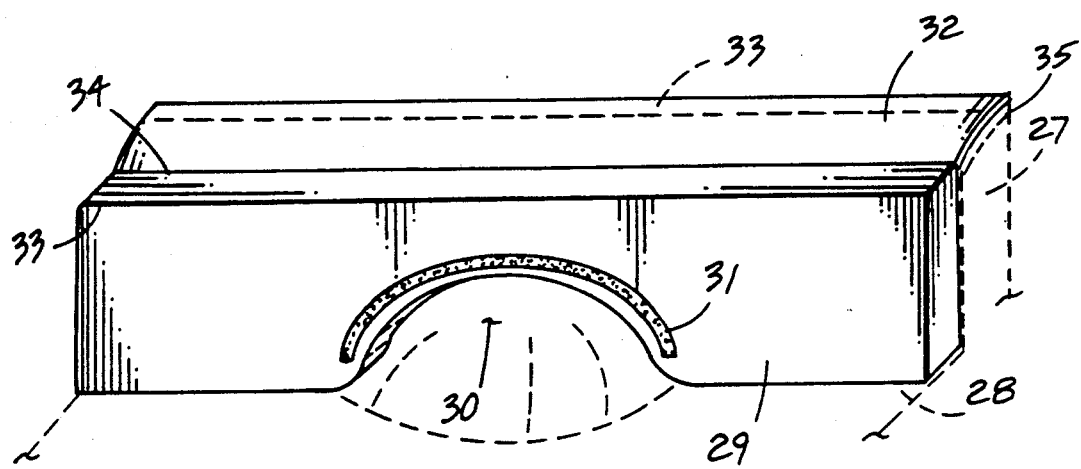

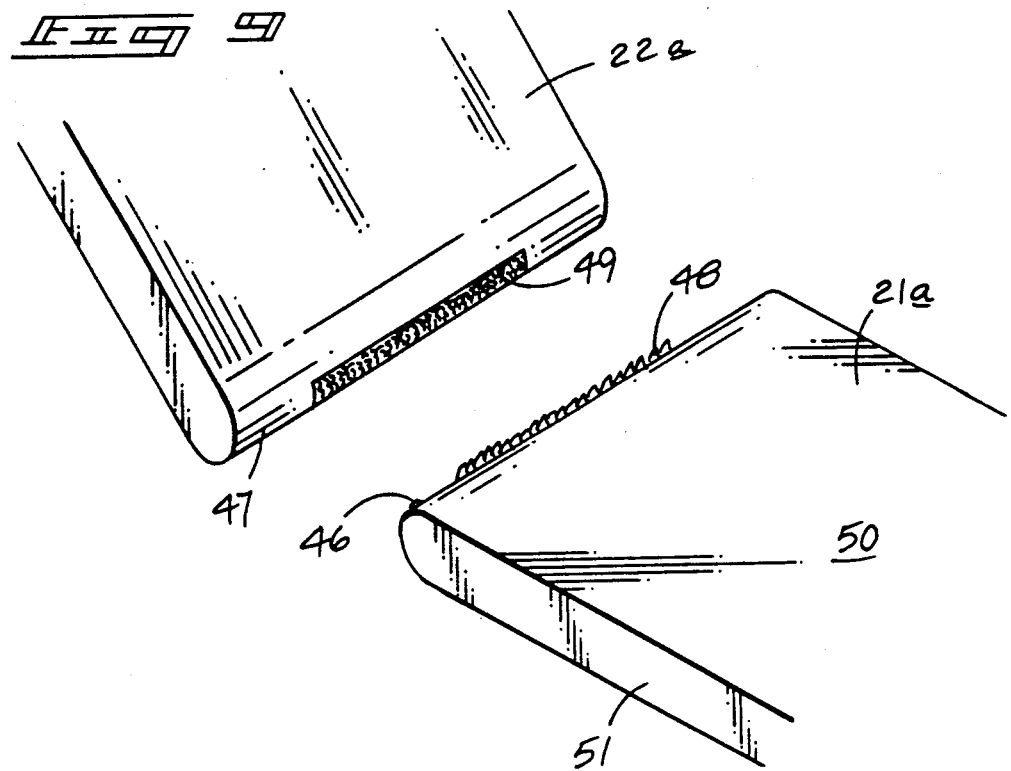
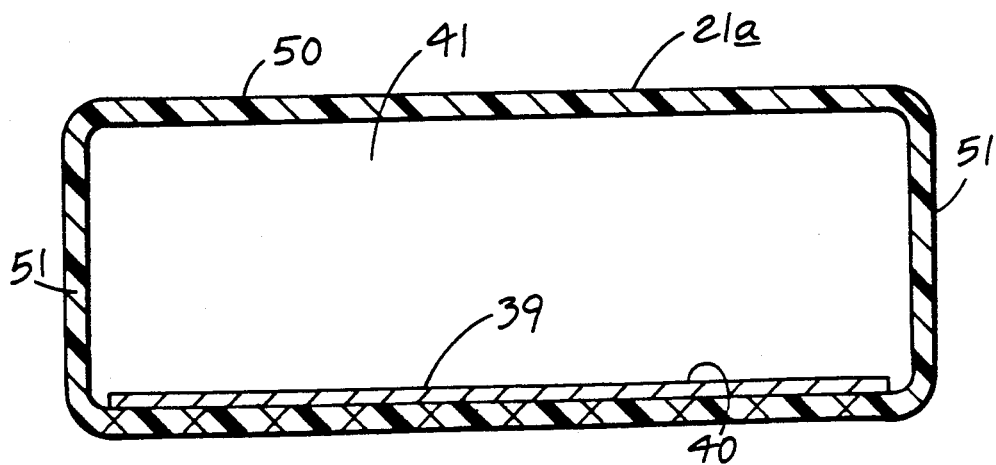

PICKUP BED SEAT APPARATUS

BACKGROUND OF THE INVENTION

1. Field of the Invention

The field of invention relates to pickup bed apparatus, and more particularly pertains to a pickup bed seat apparatus wherein the same is a padded seat and side walls positioned within the pickup bed for ease of mounting therewithin.

2. Description of the Prior Art

Various pickup bed inserts and seat structures have been provided in the prior art. In use of a pickup bed, it is frequently desirable to position various seating arrangements therewithin to permit accommodation in a comfortable manner of individuals within a pickup bed. Such prior art may be found in U.S. Pat. No. 4,679,840 to Fry, et al. wherein a seat structure is mounted in a pickup bed utilizing spaced bars to provide a seat structure for an individual.

U.S. Pat. No. 3,829,151 to Fellenstein sets forth a cover structure and seat assembly mounted in a pickup bed.

U.S. Pat. No. 3,840,263 to Bowden sets forth a seat structure for a pickup bed body, with a seat mounted within the pickup bed facing rearwardly and mounted against a frontal wall of the pickup truck body.

U.S. Pat. No. 4,623,187 to Ibrahim sets forth an insert positionable within a pickup bed utilizing configured seats formed therewithin.

U.S. Pat. No. 4,315,653 to Sparling sets forth an insert shelf mountable within a pickup truck body, as well as canopy structure therefore.

As such, it may be appreciated that there continues to be a need for a new and improved pickup bed seat apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of pickup bed seat structure now present in the prior art, the present invention provides a pickup bed seat apparatus wherein the same sets forth seating and side wall panels mounted within the pickup bed for ease of comfort and assembly relative to the pickup truck bed. As such, the general purpose of the present invention, which will be described subsequently in greater detail, is to provide a new and improved pickup bed seat apparatus which has all the advantages of the prior art pickup bed seat structure and none of the disadvantages.

To attain this, the present invention provides an apparatus for seating and entertainment arranged within a pickup bed, including an adjustable backrest mounted within the pickup to accommodate a cushion member and position a vertical extent of the cushion member in adjustable orientation relative to a horizontal portion of the cushion member. Padded wall members are provided for securement adjacent the side walls of the pickup bed, and further including a wheel well covering formed with cylindrical recesses therewithin to accommodate various drinking cups and the like therewithin. A modification of the invention includes the cushioned member formed with top and side walls of transparent material and a floor formed of opaque material with a reflective member to effect heating of chambers defined within the cushioned member or conversely, the cushioned member may be reversed to cushion the floor overlying the top wall to minimize heat buildup in the cushion member.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved pickup bed seat apparatus which has all the advantages of the prior art pickup bed seat structure and none of the disadvantages.

It is another object of the present invention to provide a new and improved pickup bed seat apparatus which may be easily and efficiently manufactured and marketed.

It is a further object of the present invention to provide a new and improved pickup bed seat apparatus which is of a durable and reliable construction.

An even further object of the present invention is to provide a new and improved pickup bed seat apparatus which is susceptible of a low cost of manufacture with regard to both materials and labor, and which accordingly is then susceptible of low prices of sale to the consuming public, thereby making such pickup bed seat apparatus economically available to the buying public.

Still yet another object of the present invention is to provide a new and improved pickup bed seat apparatus which provides in the apparatuses and methods of the prior art some of the advantages thereof, while simultaneously overcoming some of the disadvantages normally associated therewith.

Still another object of the present invention is to provide a new and improved pickup bed seat apparatus wherein the same permits ease of assembly of a seat structure within the pickup bed.

These together with other objects of the invention, along with the various features of novelty which characterize the ivention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric illustration of the cushioned seat member in association with the adjustable backrest.

FIG. 6 is an isometric illustration of the side wall cushion utilized by the instant invention.

FIG. 9 is an isometric illustration of the modified cushion member in a disassembled association.

FIG. 10 is an orthographic view, taken along the lines 10—10 of FIG. 8 in the direction indicated by the arrows.

DESCRIPTION OF THE PREFERRED EMBODIMENT

Figure 1:
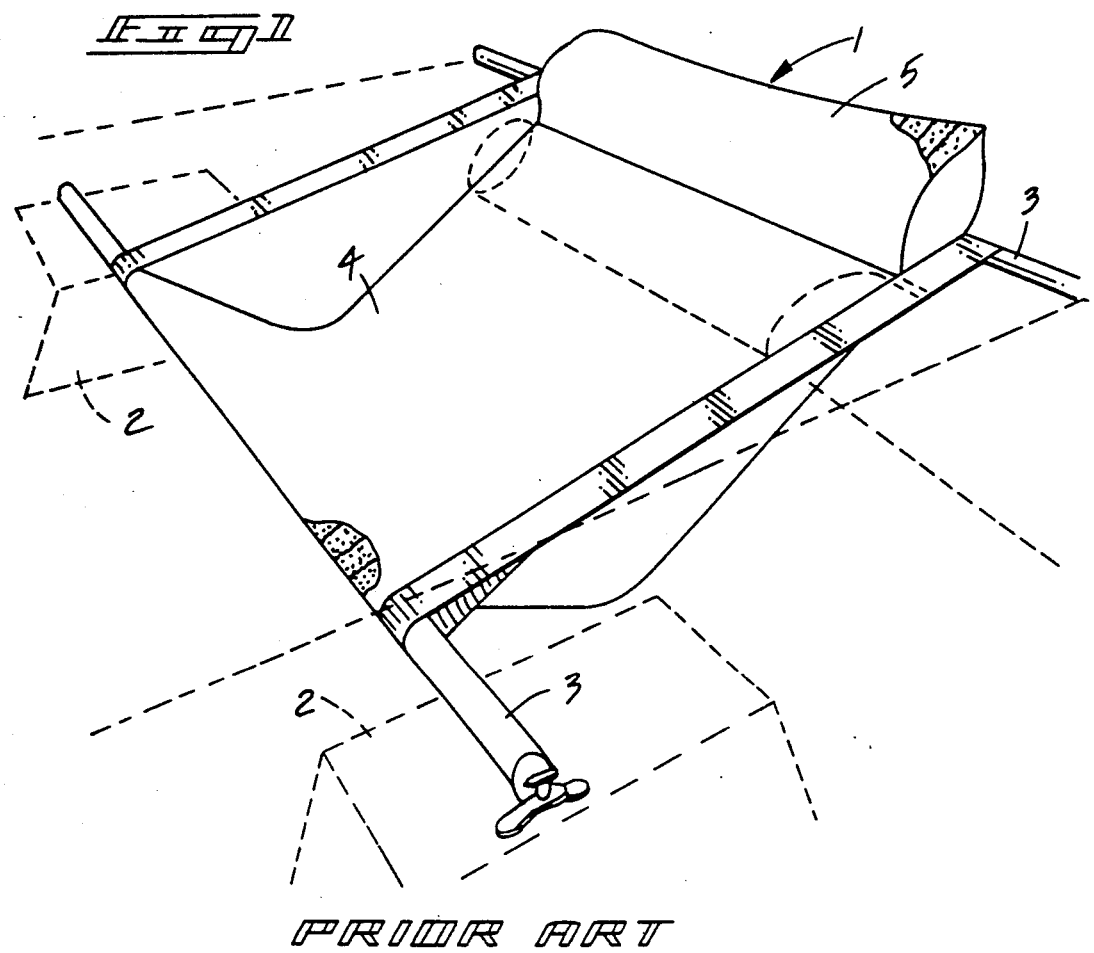
FIG. 1 is an isometric illustration of a prior art pickup bed seat structure.

With reference now to the drawings, and in particular to FIGS. 1 to 10 thereof, a new and improved pickup bed seat apparatus embodying the principles and concepts of the present invention and generally designated by the reference numerals 10-51 will be described.

Figure 2:
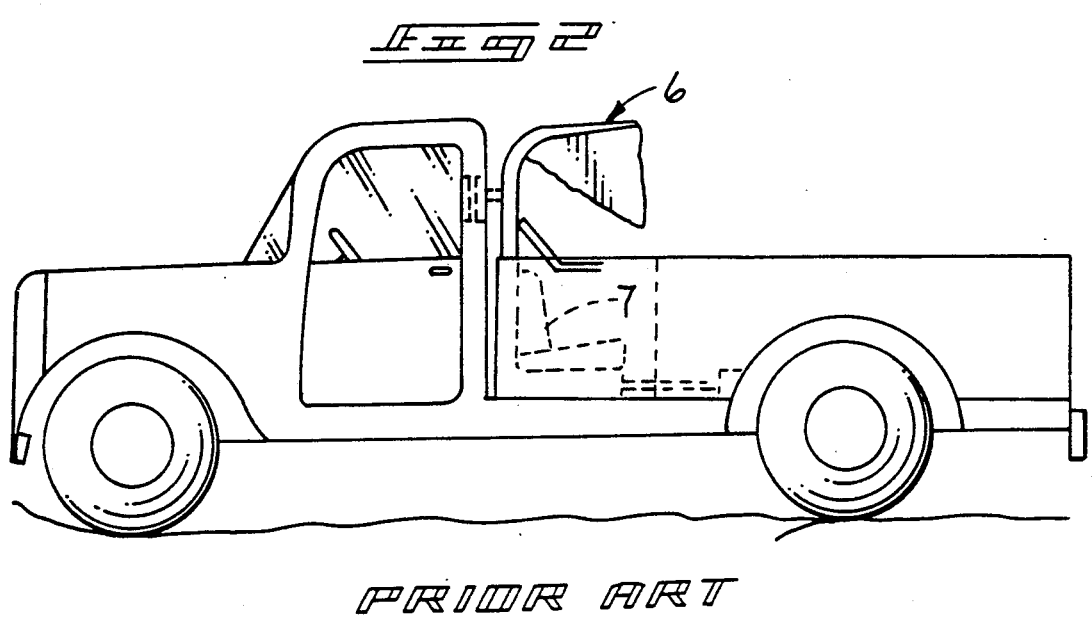
FIG. 2 is an orthographic side view of a further example of a prior art pickup bed seat apparatus.
Figure 3:
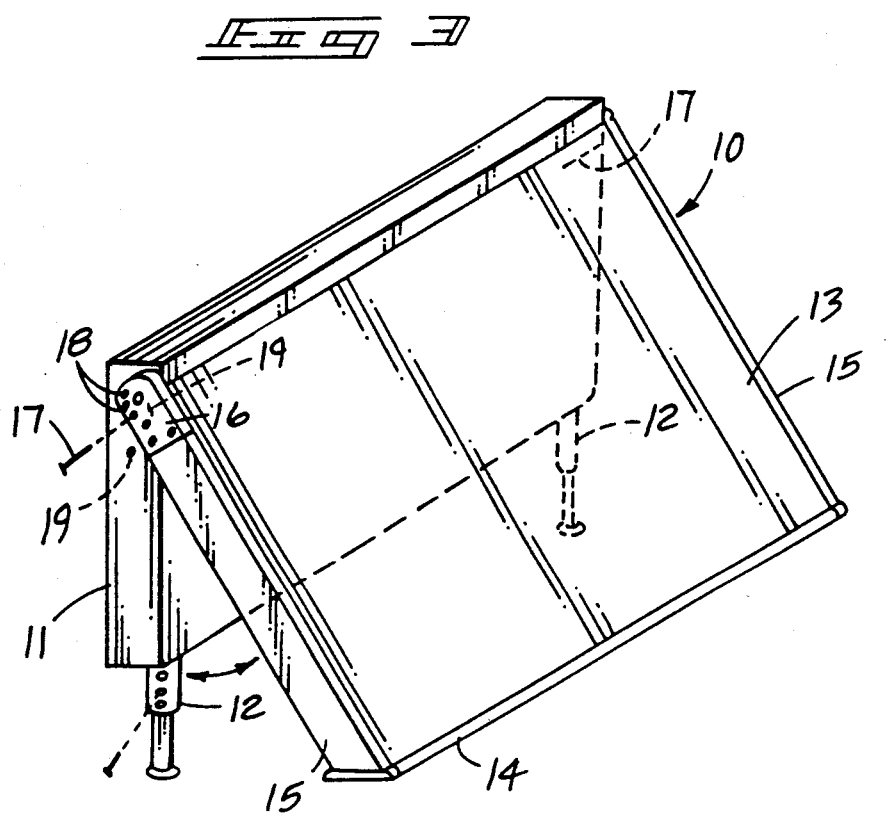
FIG. 3 is an isometric illustration of an adjustable backrest utilized by the instant invention.
Figure 4:
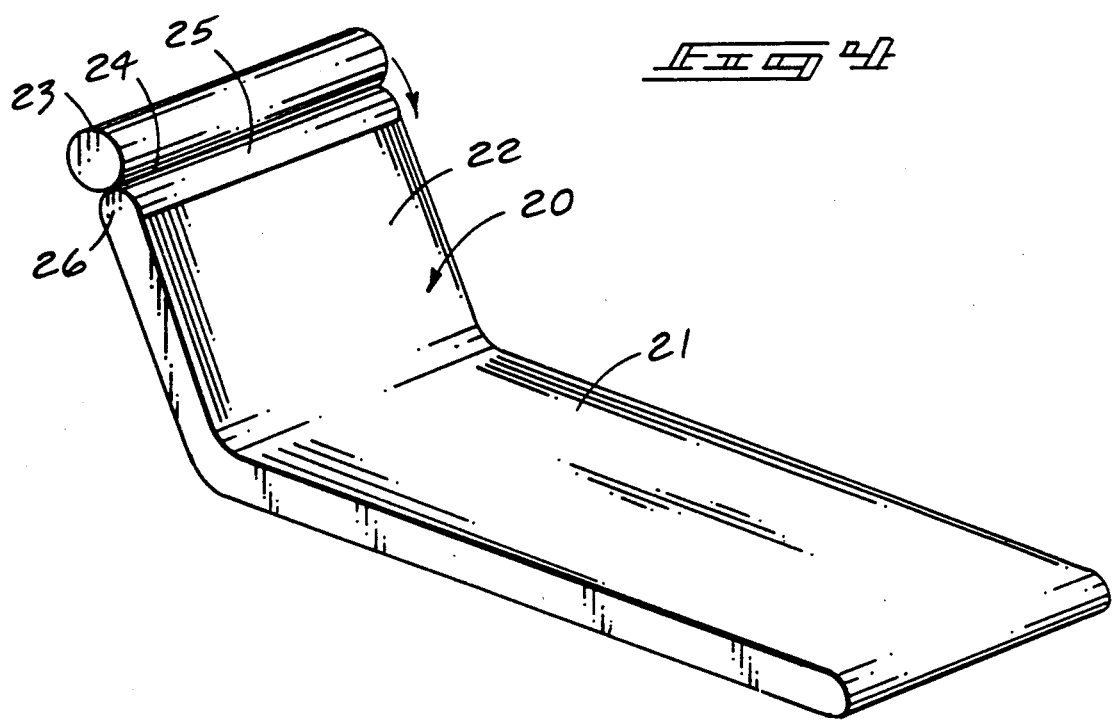
FIG. 4 is an isometric illustration of a cushioned seat member utilized by the instant invention.

FIG. 1 illustrates a prior art seat organization 1, wherein a plurality of spaced rods 3 mount a flexible web seat structure 4 therebetween utilizing a cushioned member 5 as a head rest portion, as set forth in U.S. Pat. No. 4,679,840. FIG. 2 illustrates a further prior art pickup bed seat apparatus, wherein an overhead canopy and seat structure 6 positions a seat 7 positioned against a forward wall of the pickup bed body directed rearwardly thereof, as discussed in U.S. Pat. No. 3,840,263.

More specifically, the pickup bed seat apparatus of the instant invention essentially comprises an adjustable backrest 10 positionable within a forward end of a pickup bed cooperative with a generally "L" shaped cushion member 20, and further the invention includes an elongate side wall cushion 29 coextensively mounted adjacent each side wall of an associated pickup bed 27 further employing wheel well covers 36.

The adjustable backrest 10 includes a vertical first support 11 of a generally parallelepiped configuration that includes a plurality of spaced, adjustable leg members 12. Each leg member is mounted to a bottom wall of the first support 11 and includes a main cylindrical tube mounted to the bottom wall telescopingly receiving an extensible leg therewithin in an adjustable manner. A second support 13 is pivotally mounted to the first support 11 adjacent the top wall of the first support 11 utilizing locking hinges 16 that are pivotally mounted to the side walls of the first support 11. The second support 13 further includes a resilient pad 14 coextensively mounted to the bottom wall of the second support 13 to provide a frictionally engaging surface adjacent with a conventional floor of a pickup bed. The locking hinges 16 employ locking pins 17 that are received within hinge openings 18 that are aligned with first support side wall openings 19 to adjustably and angularly position the second support 13 relative to the first support 11.

The "L" shaped cushion member 20 includes a generally horizontal elongate body portion 21 coextensively mounted to a vertical body portion 22. A cylindrical cushion 23 is mounted to an upper terminal end of the vertical body portion 22 and connected thereto by a connecting hinge line 24 that is defined by a flat member 25 overlying the upper terminal end of the vertical body portion 22 to permit the cylindrical cushion 23 to pivot downwardly and overlie the vertical body portion 22 during periods of non-use. As illustrated in FIG. 5, the adjustable backrest 10 is positional adjacent a forward wall of a pickup bed 28, with the cushion member 21 mounted on the floor thereof.

Figure 7:
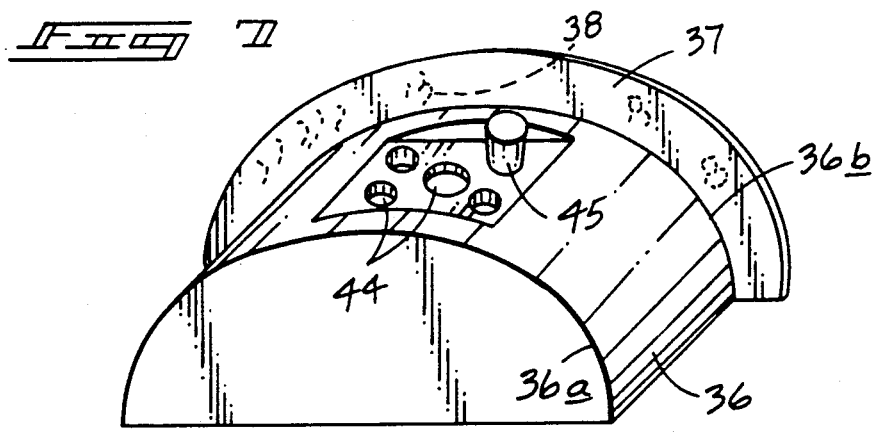
FIG. 7 is an isometric illustration of a wheel well cover assembly utilized by the side wall cushion as illustrated in FIG. 6.

FIG. 6 illustrates the use of one of a plurality of mirror image elongate side wall cushions 29. The side wall cushions 29 are arranged for contiguous mounting relative to and coextensive with each pickup bed side wall 27, wherein each pickup bed side wall is defined by a predetermined height and a predetermined length. Each side wall cushion 29 is accordingly defined by a predetermined height and a predetermined length, with the side wall cushion 29 mounted upon the floor 28 of the pickup bed. It is understood that each side wall of the pickup bed is thusly covered in a like manner by mirror image configurations of side wall cushions 29 mounted against each side wall of the pickup bed. It is noted that each side wall cushion 29 is formed with a semi-cylindrical recess 30 directed upwardly from a side wall cushion floor of each side wall cushion to accommodate a wheel well of a pickup projecting therethrough. Further, the side wall cushion top wall includes a top wall outer edge 34 and a top wall inner edge 33, each arranged in generally parallel relationship, with an elongate side wall cushion securement flap 32 coextensively mounted to the top wall outer edge 34. The side wall cushion seat member flap 32 includes a flap hook and loop fastener strip 35 coextensively mounted to the side wall securement flap 32 to cooperate with a mating hook and loop fastener strip mounted to an upper surface of each side wall 27 to mount each cushion in a predetermined orientation relative to each side wall 27. FIG. 7 illustrates the further use of a wheel well cover 36 to overlie each wheel well and is defined by a semi-cylindrical configuration including a wheel well cover inner edge 36a and a wheel well cover outer edge 36b, each of a semi-circular configuration, with a matrix of cylindrical recess cavities 44 formed within a top surface of the cover 36 to accommodate and receive various cup members 45 therewithin. A semi-cylindrical wheel well cover flap 37 is coextensively mounted to the wheel well cover outer edge 36b and includes a second hook and loop fastener semi-circular strip 38 to cooperate with a first hook and loop fastener semi-circular strip 31 that is formed about the semi-cylindrical recess 30 of the side wall cushion 29 to secure the wheel well cover 36 to the side wall cushion 29.

Figure 8:
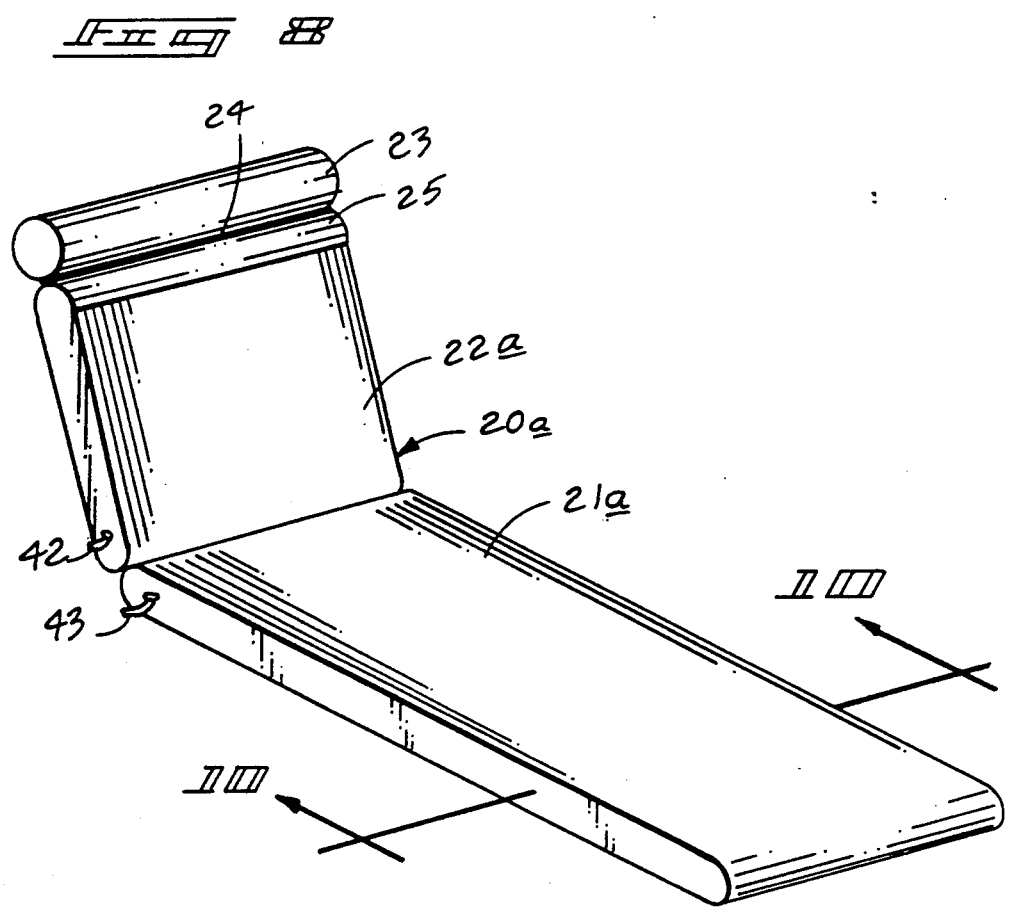
FIG. 8 is a modification of the cushioned member utilized by the instant invention.

FIGS. 8-10 illustrate a modified cushion member 20a that includes a modified horizontal body portion 21a and a modified vertical body portion 22a. The modified horizontal and vertical body portions 21a and 22a respectively each include transparent side walls, top wall, and an opaque floor. Each opaque floor has coextensively laminated thereto a reflective foil layer 39 to effect heating of a chamber 41 defined within each body portion of the cushion member 20a. As illustrated in FIG. 10 for example, the opaque floor 40 of the horizontal body portion 21a is positioned underlying and parallel the transparent top wall 50 between transparent side walls 51. In this manner, the modified cushion member 20a is heated when in a normal orientation, but may be inverted by positioning the opaque floor 40 overlying the top wall 50 to minimize solar heating of the chamber 41. To achieve this, the cushion member 20a is merely traversed where the top wall 50 and top wall of the vertical body portion 22a are positioned in contact with the floor 28. It is further noted that each horizontal and vertical body portion 21a and 22a respectively is inflatable to a predetermined pressure by use of respective first and second inflation valves 42 and 43. The vertical body portion 22a is pivotally mounted relative to the horizontal body portion 21a utilizing an elongate hook and loop fastener organization that comprises a horizontal cushion hook and loop strip 48 mounted to the horizontal cushion upper end 46. A vertical cushion lower end 47 includes a mating vertical cushion hook and loop strip 49, whereupon securement of the strips 48 and 49 together provides a hinge permitting the aforenoted pivotment of the vertical body portion relative the horizontal body portion.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pickup bed seat apparatus mounted within a pickup bed, wherein the pickup bed is defined by a pickup bed floor and pickup bed side walls each defined by a predetermined length, and wherein the pickup bed side walls are defined by a predetermined height, wherein the apparatus comprises, an adjustable backrest, including a vertical first support member and a second support member pivotally mounted relative to the vertical first support member, with the second support member defining an acute included angle between the second support member and the first support member, the second support member defining an inclined support surface, and a generally "L" shaped cushion member including a vertical body portion and a horizontal body portion, with the vertical body portion in contiguous communication with the inclined support surface, and at least one elongate side wall cushion securable against at least one side wall, and further including a wheel well cover securable to the side wall cushion, and wherein the vertical first support member is defined by a generally parallelepiped configuration, including a top wall spaced above and parallel a bottom wall, and spaced side walls, the bottom wall including a plurality of adjustable leg members mounted thereon, and a second support member including further side walls defining the inclined support surface therebetween, each of the further side walls includes a locking hinge, wherein each locking hinge is pivotally mounted to a side wall of the first support member, the locking hinge includes a plurality of apertures and each side wall includes a plurality of further apertures, wherein a lock pin is positionable between each aperture cooperative with a further aperture to adjustably lock the second support member relative to the first support member, and the second support member further includes a second support bottom wall, wherein the second support bottom wall includes a resilient pad coextensively mounted to the second support bottom wall for frictional engagement with the floor of the pickup bed.

2. An apparatus as set forth in claim 1 wherein at least one elongate side wall cushion is defined by a length equal to the predetermined length and further defined by a height equal to the predetermined height, and includes a semi-cylindrical recess directed therethrough to accommodate a wheel well of the pickup bed, and a first hook and loop fastener semi-circular strip mounted to the elongate side wall cushion about the semi-cylindrical recess, and the side wall cushion further includes a side wall cushion top wall, and the side wall cushion top wall includes an inner edge coextensive with the side wall, and the inner edge includes an elongate side wall cushion securement flap coextensively mounted thereto, the side wall cushion securement flap is positioned overlying an associated side wall of the pickup bed and includes an elongate flap hook and loop fastener strip for cooperation with an associated side wall hook and loop fastener strip to secure the side wall cushion securement flap to the side wall.

3. An apparatus as set forth in claim 2 wherein the wheel well cover is formed of a semi-cylindrical configuration and includes a wheel well cover inner edge spaced from and parallel a wheel well cover outer edge, the wheel well cover inner edge includes a semi-cylindrical wheel well cover flap, the semi-cylindrical wheel well cover flap includes a second hook and loop fastener semi-circular strip mounted thereto complementarily cooperative with the first hook and loop fastener semi-circular strip to secure the wheel well cover to the side wall cushion, and the wheel well cover further includes a matrix of cylindrical recess cavities directed within the wheel well cover to receive a cup member selectively within each cylindrical recess cavity.

4. An apparatus as set forth in claim 3 wherein the "L" shaped cushion member includes an inflatable horizontal body portion and inflatable vertical body portion, each horizontal and vertical body portion includes a transparent top wall and transparent side walls, and the horizontal body portion includes a horizontal body portion opaque floor and the vertical body portion includes a vertical body portion opaque floor, and a reflective foil layer coextensively mounted within each body portion overlying each opaque floor coextensively therewith.

5. An apparatus as set forth in claim 4 wherein the horizontal body portion includes a horizontal body portion upper end and the vertical body portion includes a vertical body portion lower end, the horizontal body portion upper end includes a horizontal cushion hook and loop fastener strip, and the vertical body portion lower end includes a vertical cushion hook and loop strip, wherein the horizontal cushion hook and loop strip is securable to the vertical cushion hook and loop strip to provide a connection between the horizontal body portion and the vertical body portion.

6. An apparatus as set forth in claim 5 wherein the vertical body portion includes a tubular cushion member mounted to an upper terminal end of the vertical body portion remote from the vertical cushion lower end and wherein the cushion is pivotally mounted to the vertical body portion.

* * * * *